Patented Jan. 13, 1942

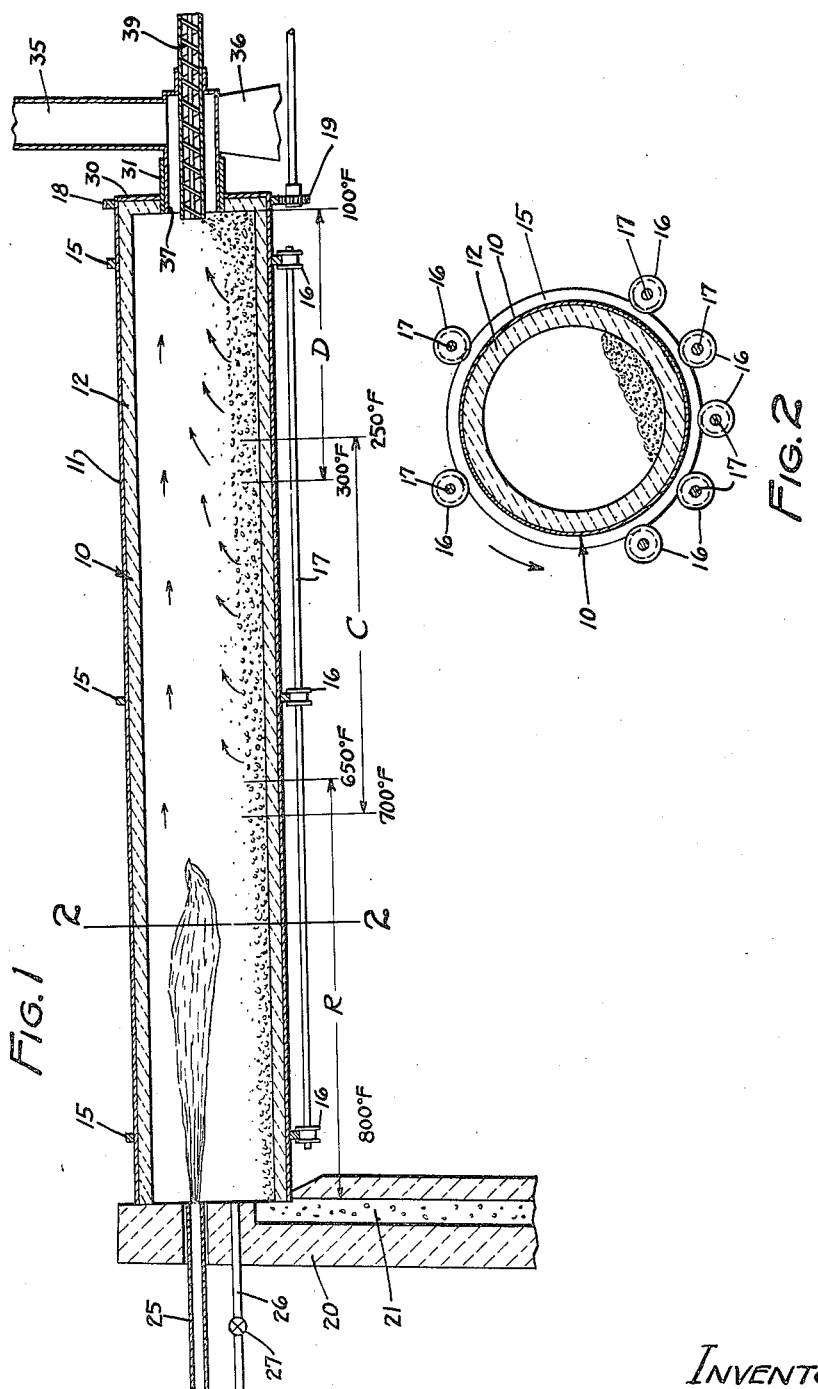

2,269,465

UNITED STATES PATENT OFFICE 2,269,465

METHOD OF TREATING IRON ORE

Henry G. Lykken, Minneapolis, Minn.

Application November 16, 1938, Serial No. 240,731

8 Claims. (Cl. 209—8)

This invention relates to a process of increasing the magnetic permeability of non-magnetic iron ores of the types which include a larger percentage of oxygen than that included in magnetite. Such ores may be hematites ($Fe_2O_3$) which when in the pure, moisture-free state contain 70% iron, or are the so-called hydrated ores which by some are classed among the hematites. Magnetites ($Fe_3O_4$) in the pure, moisture-free state contain 72.4% iron.

The largest deposits of iron ores in the United States are the hematites and while these in the pure state contain 70% iron, only a very small percentage of the deposits contain more than 50% iron, the remainder being interspersed rock of various types, chiefly infiltrated material (gangue).

For the efficient smelting of iron, an ore having an iron content considerably in excess of 50% is required, and as a consequence only the dwindling store of the richer ores can be used without some process of concentration. The richest ores and concentrated ores sell at a large premium, which increases with each per cent of iron content because for many obvious reasons that need not be discussed, the cost of pig iron increases very rapidly as the iron content in the ore decreases.

The magnetite ores are readily concentrated by magnetic separators which are well known in the commercial art, but the bulk of the available ores, namely, the hematites and hydrated ores, cannot be concentrated by this method due to the fact that their low magnetic permeability does not serve to distinguish them from the non-ferrous constituents of the ore. They may be concentrated to some extent by washing and jigging but only at the expense of a great deal of iron oxide which is lost in the operation, and certain other disadvantages, such as the large increase in moisture content.

When hematite ($Fe_2O_3$) is heated in the presence of hydrogen ($H_2$) or carbon monoxide (CO) these gases react and change the hematite to magnetite ($Fe_3O_4$) in accordance with the following reactions:

$$3Fe_2O_3 + H_2 = 2Fe_3O_4 + H_2O$$
$$3Fe_2O_3 + CO = 2Fe_3O_4 + CO_2$$

Various methods have been proposed for changing hematite type ores to magnetite type ores as a preliminary step for the magnetic separation of the ferrous constituents from the non-ferrous impurities or "gangue" and have sought to utilize these reactions.

In certain of these methods hydrocarbon gases and oils, or solid hydrocarbons have been suggested as the source of the reducing gases, but these processes have the disadvantage of requiring high temperatures for the ultimate fractionation of the carbonaceous material if a distillation or cracking method is used, or for the water gas or producer gas reaction, if such methods are used.

In some of the ore reducing methods the gases are externally generated. This method involves the difficult problem of uniformly distributing the hot gases through the material to be treated. In certain other processes it has been suggested that the reducing gases be generated in situ in the ore to be treated by admixing carbonaceous material such as peat, coal, oil, pitch, or the like with the ore. In these latter processes the difficulty may be that high temperatures must be used to produce ultimate fractionation if hydrocarbons are used, or to promote the water gas reaction, if solid carbonaceous materials are used, or if high temperatures are avoided it is necessary to use excessively large amounts of the reducing ingredient, and to contend with a slow rate of reaction. Where the gas-producing reaction is carried out in situ in the ore, it is necessary that an oxidizing atmosphere be excluded, and it has been suggested that such processes be carried out in a retort or kiln from which air is excluded and by applying heat externally to the retort or kiln. When using such an apparatus a relatively larger amount of fuel is required to heat the mass of ore and carbonaceous material to the reaction temperature because of the slow heat penetration through the walls of the retort or kiln.

I have discovered that hematite and similar high oxygen content ores may be reduced to the magnetite oxide without the necessity of heating them to the high temperature required for the above reactions, and as a consequence my process may be carried out within present commercial cost limitations. My process depends upon the solid phase reaction of the activated carbon with the iron oxide which takes place in accordance with the following equation:

$$6Fe_2O_3 + C = 4Fe_3O_4 + CO_2$$

and the reaction of carbon monoxide with the iron oxide which takes place in accordance with the following equation:

$$3Fe_2O_3 + CO = 2Fe_3O_4 + CO_2$$

I have discovered that both of these reactions, and also the production of carbon monoxide may be carried out at temperatures below 800° F. average temperature throughout the mass. The amount of heat thus required for conversion of the ore is only a fractional part of that required when the ore is heated to the high temperatures used in some prior processes.

It is therefore an object of the present invention to provide a process for reacting upon high oxygen content iron ores for reducing them to magnetite type ores and to provide an apparatus for carrying out such process.

It is a further object of the invention to provide a process by which high oxygen content ores may be reduced to magnetite type ores at relatively low temperatures.

It is a further object of the invention to provide a process for producing heat for said reaction in situ and for producing activated material and carbon monoxide in situ for carrying out such process.

It is also an object of the invention to provide a method carrying out the foregoing reactions in an oxidizing atmosphere whereby expensive equipment and low heating efficiency may be obviated.

It is also an object of the invention to provide a new, useful and economical method producing magnetite type ores from high oxygen type ores.

It is an ancillary object to provide such a process in which the danger of reduction to ferrous oxide (FeO) is minimized.

The method of the present invention is described with reference to the drawing in which Figure 1 is a schematic view in section of an apparatus for carrying out my invention; and Figure 2 is a sectional view along the line 2—2 of Figure 1.

In carrying out the method of the present invention iron ore of the high oxygen content type such as the hematite ores or hydrated iron ore are crushed. During the crushing operation a large amount of "fines" are produced in addition to the larger particles of ore, but these do not interfere with the carrying out of the process and no special precautions are necessary in order to prevent the development of the "fines" in the ore.

The crushing size may vary considerably depending upon the distribution of the impurities in the ore. Thus, if the impurities are very finely divided a finer degree of crushing is required than when the impurities are less finely dispersed. It is usually unnecessary to crush the ore to a size below ¼ inch mesh although smaller sizes and the "fines" may all be used.

It is desirable in the crushing operation to free each particle of the impurity from the next adjacent particles in the ore, so that during the subsequent magnetic separation a relatively smaller amount of impurities will be carried over due to physical attachment to the ferrous constituents of the ore. The crushing operation is carried out with this end in view and the size of the crushing determined by the requirements of the particular ore.

To the crushed ore is then mixed a comminuted solid carbonaceous material, such as coal, peat, lignite, carbon or various cokes. I prefer to use comminuted lignite, which has first been dried to its approximate hydroscopic balance which for most lignite is from 15 to 16% water content. The lignite or other carbonaceous material is pulverized as far as economically possible. At the present time such materials may be economically comminuted to 300 mesh to the inch and this size is desirable, although I may use material which is as coarse as 200 mesh with satisfactory results.

Theoretically 17.6 pounds of carbon is required to convert one ton of pure hematite to magnetite and when the ore contains less than 100% of iron oxide a smaller amount of carbon is theoretically required. Per ton of ore I have found, however, that for other reasons which will hereinafter be explained, it is desirable to mix from 10 to 12% by weight of dried pulverized carbonaceous material to the ore. A very considerable variation above and below this percentage range is possible without appreciably interfering with the results obtained. Thus, when using pulverized lignite I add from 10 to 12% by weight and intimately dry mix this with the crushed ore. It is the aim to cover every particle of ore with a dry film of carbonaceous dust such as lignite dust, but obviously the finer ore particles may not be completely covered but merely intimately associated with adjacent particles of carbonaceous material. A considerable excess of lignite is used, as compared with the theoretical requirements in order, among other reasons, to obtain adequate coverage of the particles.

Due to the much lower specific gravity of the carbonaceous material and hence greater bulk, and the fine pulverization and also due to the fact that the number of carbonaceous particles is so vastly greater than the number of ore particles, it is possible by dry mixing to produce an intimate association between the carbonaceous dust and the ore. This may be done conveniently by a paddle mixer or tube mill.

The dry intimately mixed ore and carbonaceous material dust is then gradually heated. As the temperature of the mass is raised the residual moisture in the mass is first driven off together with most, if not all, of the volatiles in the carbonaceous material. Thus when lignite is being used the residual water content of from 15 to 16% is driven off, together with any residual water present in the ore. This occurs at temperatures between 100 and 300°. Then, as the temperature is further increased, distillation of the lignite begins and continues, during which time methane, hydrogen, tarry residues and occluded gases are driven off.

I prefer to carry away the products of distillation and other products given off during the distillation period. As distillation is completed there is deposited a soft residual carbon which is in a highly activated state, and is intimately admixed with the ore due to the fact that the carbonaceous material from which it was generated was intimately mixed with the ore.

The temperature is continued to be raised until it is at, or somewhat higher than the ignition temperature of the carbonaceous material being used. In the case of lignite coal which has been powdered and carbonized in situ upon the ore, the ignition temperature is from 650 degrees to 750 degrees F. which is low as compared with the ignition temperatures of other carbons, and I therefore prefer for this and other reasons, to use lignite.

As the temperature reaches the ignition point a small proportion of free oxygen controllably admitted to the reaction zone ignites the highly reactive, or activated carbon, which thereupon rapidly increases its own temperature to incandescence. The amount of the oxygen present is, however, adjusted so that the activated carbon does not completely oxidize and as a consequence carbon monoxide is generated. This is due to the fact that the temperature of the dust-like carbon particles themselves, in igniting and glowing, rapidly rises above the average temperature of the ore mass and since carbon is present in excess any carbon dioxide present is consequently reduced back to carbon monoxide. The adjustment of the oxygen to accomplish partial oxidation of the activated carbon may take the form of limiting the total supply of oxygen present, or it may be accomplished by moving the ore-activated carbon mass out of the oxidizing zone at an appropriate moment. This adjustment of the oxygen may also take place by a combination of these methods as hereinafter explained.

The ignition and glowing of the incandescent highly activated carbon which is deposited upon the surface of and intimately admixed with the ore particles produces a solid phase reaction between the incandescent carbon and the ore and at the same time promulgates a reaction between the carbon monoxide produced as described, and the ore. The partial-burning and incandescency of carbon particles moreover produces considerable heat in situ, and this very efficiently provides heat necessary for the ore reduction reactions, which are slightly endothermic. The whole mass may thus be heated to a varying degree, depending upon the carbon and oxygen present. A large portion of the carbon present, over that theoretically necessary to reduce the hematite to magnetite may be effectively consumed in this way to supply a part of the heat for the reaction. It is noted here that there is no danger of over reduction to FeO at the moderate average temperatures attained by the mass. After the reaction is completed by the glowing of carbon the ore is dumped and permitted to cool out of contact with oxygen-bearing vapors.

The process of the present invention may be carried out in a wide variety of kilns and furnaces, one of which types is illustrated in Figures 1 and 2. The furnace therein illustrated comprises an elongated tube generally designated 10, having a steel shell 11 which is lined with fire brick or other refractory material 12. The tube is provided with a plurality of wheel tracks 15 of sufficient width and number to give adequate support. These tracks are supported by a plurality of wheels 16 which are in turn rotatably journaled on shafts 17.

At one end of the tube 10 there is provided a bull gear 18 with which a drive pinion 19 meshes. The pinion is rotated so as to revolve the furnace tube 10 at a slow speed. The furnace is mounted in slightly inclined position and at its lower end fits against a stationary wall 20 in reasonably gas-tight relation. Any suitable joint may be used between the furnace and wall. The wall 20 is cut away at 21 to provide a discharge port for the treated ore.

At the lower end of the tube there is also provided a gas or powdered fuel burner 25 and if desired an auxiliary air intake pipe 26, which is provided with a valve 27. The upper end of the tube is closed by plate 30 which is provided with a central extension 31. Adjacent the plate 30 there is a stationary stack 35 which is mounted on a pedestal 36. The stack is provided with an extension 37 which fits neatly with extension 31 of the furnace so as to provide a gas-tight connection between the stationary stack and the rotative furnace. Centrally mounted within the extension 37 there is a screw fed conveyor 39 by which the previously prepared mixture of ore and carbonaceous material may be fed into the furnace.

The ore is crushed and treated with a predetermined amount of carbonaceous material, preferably finely pulverized lignite, as previously described, and is then moved into the furnace by means of the screw conveyor 39.

The material falls into the furnace adjacent end 30 and slowly moves downwardly through the mill 10 as the mill rotates.

In this connection it is noted that the burner 25 produces a flow of hot products of combustion from the burner end of the furnace to the stack, whereas the flow of ore and carbonaceous material is from the stack end to the burner end of the furnace. The counter-currents of ore and hot products of combustion therefore give efficient heat exchange, by which the drying, coking and reacting stages of the process are carried out.

As the material moves from the enclosure 10 through the distance indicated by dimension line D it is heated and dried and residual moisture present in the carbonaceous material such as the 15 to 16% residual moisture of lignite, together with any residual moisture of the ore are all driven off by the countercurrent of the hot gases from burner 25 and are carried outwardly through stack 35. The space designated by dimension D therefore designates the zone in which the drying function predominates. In this zone the temperatures of the gases are reduced to from about 300° to 100° F. as they pass toward the outlet end of the furnace. These temperatures are merely suggestive and are shown in Figure 1.

In the zone designated by the dimension C the temperatures of the gases range from about 700° down to about 250° in the direction of the gas flow and throughout this zone carbonization of the carbonaceous material, for example, lignite, takes place. This involves the giving off of methane and other hydrocarbons, volatilized tarry materials from the carbonaceous material, and incidentally the occluded gases in the ore and lignitic material are driven off. Such of these materials as are combustible are burned with any residue of oxygen present in the stream of hot products of combustion which pass over the ore.

As the ore reaches the hot end of carbonization zone C the carbonaceous material has been brought to the highly reactive porous, readily ignitable condition and as the material moves into the reaction zone R ignition and incandescence of the carbon dust layers and particles takes place due to the presence of oxygen in this zone. The oxygen may be introduced into the furnace as excess air in burner 25, or for convenience the introduction of such oxygen may be by means of an auxiliary inlet pipe 26 through which the flow of air or oxygen may accurately be controlled by means of valve 27.

The amount of oxygen permitted to be present in the furnace, and particularly in the reaction zone, is sufficient only partially to burn the carbonaceous material, as previously described. In so doing it generates carbon monoxide and the solid phase and CO reactions take place and convert the hematite to magnetite.

As explained above this partial combustion may be controlled by limiting the air supply or by spacial separation of the air and ore. In the furnace illustrated both of these functions occur. The total air supply is limited but not necessarily to an amount which is less than that required to theoretically burn all of the carbonaceous material present because only the surface of the ore-carbon mass is exposed. The ore is constantly rolled over on itself and hence burning may begin and then be quickly inhibited when the incandescent carbon is submerged under adjacent carbon-covered ore. Hence the total oxygen present may be many times the amount necessary to theoretically burn all of the carbonaceous material present, but actually only enough to give incomplete combustion due to the spacial separation of the available oxygen and the carbonaceous material. Many variations in ways and means for accomplishing the same end will, in view of the teaching herein, occur to those skilled in the art. In this specification and in the claims "insufficient oxygen" means an insufficiency where needed, and does not refer to any insufficiency in, for example, the furnace as a whole.

After completion of the reaction the ore is discharged through opening 21 to a cooling pit from which the contained heat may, if desired, be extracted by any suitable apparatus for the preheating of air for burner 25 or for the preheating and preliminary drying of the carbonaceous material. Thus when lignite is used such residual heat in the treated ore may be used to drive off the water which is usually present in quantities up to 30% in the raw lignite and thus preliminarily dry the lignite down to its hydroscopic balance of from 15 to 16% water content. The residual heat may also be utilized for drying the ore.

It will be noted from the schematic showing in Figure 1 that the temperature zones of the drying zone D, carbonization zone C and reaction zone R overlap to a varying degree. By this it is intended to show that the drying carbonization and reaction zones are not sharply defined in the furnace but merely generally defined by the predominant functions of such zones. Thus at the hot or 300° end of the drying zone some carbonization will already have taken place and at the hot or 700° end of the carbonization zone some ignition may already have taken place.

By applying the heat by means of burner 25 within the furnace, ignition of the highly reactive carbon may readily be achieved without bringing the temperature of the bulk of the ore above that required to carry out the solid phase and carbon monoxide reactions.

As explained above, after ignition the carbonaceous dust glows to incandescence and thus liberates in situ sufficient heat to furnish the heat of reaction for reducing the high oxygen content ores to the lower oxygen content ores. The incandescence and partial oxidation of the dust also produces a liberal amount of carbon monoxide in situ, which is an important phase of the invention.

The rotative function of the furnace facilitates the drying, carbonization, and reaction functions in the various zones and facilitates heat penetration to the entire mass of dusted ore and also serves in the reaction zone to control the oxidation function.

Many modifications may be made in the method and apparatus. Thus instead of using a slowly rotating kiln the material may be processed in a stationary furnace and constantly agitated upon itself while raising the temperature to the desired point of reaction for batch operation. Or a stationary continuous process furnace may be used. Other corbonaceous material than lignitic materials may be used, although this may require an increase in temperature in order to obtain ignition. Also, previously charred lignite or other carbonaceous material may be applied to ore rather than formed in situ. The heat necessary for the process may be applied externally instead of internally as described and illustrated herein, or may be applied by combination of external and internal heating arrangements.

These and other modifications may be obviously made without departing from the spirit of the invention described and claimed as follows.

I claim as my invention:

1. A process of increasing the magnetic permeability of non-magnetic iron ore particles of low grade ore having a size sufficiently small to pass through about a 4 mesh screen which comprises dusting said ore particles with lignite dust having a particle size sufficiently small to pass through about a 200 mesh screen, progressing said lignite-dusted ore through successive zones of increasing temperature to dry and char said lignite dusting, and then progressing said dusted ore into a zone having a temperature sufficiently high to ignite said lignite but in which there is not sufficient oxygen to completely burn said lignite.

2. An improved process of increasing the magnetic permeability of non-magnetic iron ore having a higher oxygen content than magnetite which comprises, dusting said ore particles with finely divided lignitic material having an average particle size materially smaller than the average particle size of the ore being processed, the amount of lignitic material being sufficient to provide carbon in excess of the theoretical amount of carbon necessary to reduce said ore to magnetite, thereafter progressing said dusted ore through a tube, progressing hot gases through said tube in a direction counter to the flow of the dusted ore, said gases being initially at a temperature higher than the ignition temperature of said lignitic material when carbonized, and introducing oxygen with said hot gases in an amount sufficient to partially oxidize said lignitic material.

3. An improved process of treating non-magnetic iron ores having an oxygen content greater than the oxygen content of magnetite which comprises, dusting such ore with partially dried lignitic material dust having an average particle size materially smaller than the average particle size of the ore being treated, said lignitic material being applied in an amount sufficient to form a dust coating over a substantial proportion of the surface of the ore particles, thereafter gradually heating said dusted ore to first drive off the residue of moisture in the lignitic material and then char said material to form a highly reactive carbon in situ upon the ore, and then continuing said heating in an atmosphere which contains sufficient oxygen to ignite but only partially to oxidize said lignitic material, until the lignitic material ignites and partially burns.

4. An improved process of treating non-magnetic iron ore having an oxygen content greater than the oxygen content of magnetite which comprises dusting such ore with from about 10% to about 12% by weight of a dust of lignitic material, said dust having a size sufficiently small that it will pass through about a 200-mesh screen, thereafter gradually heating said dusted ore to first drive off moisture from said lignitic material dust and then char said dust in situ upon the ore, and then continuing said heating in an atmosphere which contains sufficient oxygen to ignite but only partially oxidize the lignitic material until the lignitic material ignites and partially burns.

5. A process for magnetizing non-magnetic iron ore having an oxygen content greater than magnetite, which comprises first intimately incorporating and distributing throughout the ore mass a lignitic dust which is sufficiently small in size so that most of the dust passes through a 200-mesh screen, which dust is dried to the approximate hydroscopic balance, then heating the mixture to drive off the residual volatile matter, and carbonize said lignitic material while in intimate contact with the iron oxide, continuing the heating of the mass to the ignition temperature of said carbon, and adding air in an amount sufficient to provide ignition but only partial oxidation of said carbon by said air.

6. A process for magnetizing non-magnetic iron ore having an oxygen content greater than magnetite which comprises first intimately incorporating and uniformly distributing throughout the ore mass a lignitic dust which is sufficiently small in size so that most of the dust passes through a 200-mesh screen, which dust is dried to the approximately hydroscopic balance, then heating the mixture to drive off the residual volatile matter and carbonize said uniformly distributed lignite while in intimate contact with the iron oxide, and continuing the heating of the mass until the ignition temperature of said carbonized lignitic material is reached, said heating being in the presence of a controlled amount of air, said amount of air being sufficient to ignite but only partially burn said carbonized lignitic material to an extent sufficient to heat the carbonized lignitic material and to generate carbon monoxide gas in situ in the mass.

7. A process for magnetizing non-magnetic iron ore which comprises intimately incorporating and distributing finely divided lignitic material throughout an iron ore mass, flowing said mass progressively through a confined counter current of hot gases, the temperature of which increases in the direction of flow of said mass from a temperature sufficiently high to drive off moisture incidental to said mass, then to a temperature sufficiently high to drive off the volatiles from said lignitic material and to char the same in situ on said ore surfaces, and then to a temperature sufficiently high to ignite charred lignitic material, and introducing oxygen into said counter current in an amount sufficient to bring said charred lignitic material to incandescense and partially burn the same in situ in intimate surface association with said ore.

8. A process for increasing the magnetic permeability of iron ore which comprises admixing powdered lignite material with said ore, moving said ore-lignitic material mixture successively through a plurality of zones of gradually increasing temperature the highest temperature of which is sufficiently high to ignite said lignitic material, introducing a limited amount of air insufficient to effect complete combustion of the lignite and traversing hot products of combustion through said zones in the opposite direction from the highest temperature zone to the lowest temperature zone, whereby the waste heat from each higher temperature zone becomes the heating medium of the next lower temperature zone.

HENRY G. LYKKEN.